(12) United States Patent
Xie et al.

(10) Patent No.: US 10,706,234 B2
(45) Date of Patent: Jul. 7, 2020

(54) CONSTITUENT CENTRIC ARCHITECTURE FOR READING COMPREHENSION

(71) Applicant: Petuum Inc., Pittsburgh, PA (US)

(72) Inventors: Pengtao Xie, Pittsburgh, PA (US); Eric Xing, Pittsburgh, PA (US)

(73) Assignee: Petuum Inc., Pittsburgh, PA (US)

( * ) Notice: Subject to any disclaimer, the term of this patent is extended or adjusted under 35 U.S.C. 154(b) by 115 days.

(21) Appl. No.: 15/948,241

(22) Filed: Apr. 9, 2018

(65) Prior Publication Data

US 2018/0300314 A1 Oct. 18, 2018

Related U.S. Application Data

(60) Provisional application No. 62/484,833, filed on Apr. 12, 2017, provisional application No. 62/654,671, filed on Apr. 9, 2018.

(51) Int. Cl.

| | |
|---|---|
| G06F 40/30 | (2020.01) |
| G06N 3/04 | (2006.01) |
| G06N 3/08 | (2006.01) |
| G06F 16/332 | (2019.01) |
| G06N 5/04 | (2006.01) |
| G06N 5/02 | (2006.01) |
| G06F 40/205 | (2020.01) |
| G06F 40/216 | (2020.01) |

(52) U.S. Cl.
CPC .......... *G06F 40/30* (2020.01); *G06F 16/3329* (2019.01); *G06F 40/205* (2020.01); *G06F 40/216* (2020.01); *G06N 3/04* (2013.01); *G06N 3/0445* (2013.01); *G06N 3/0454* (2013.01); *G06N 3/08* (2013.01); *G06N 5/022* (2013.01); *G06N 5/04* (2013.01)

(58) Field of Classification Search
CPC ........ G06F 17/2785; G06F 40/30; G06N 3/02
See application file for complete search history.

(56) References Cited

U.S. PATENT DOCUMENTS 8,069,101 B1 * 11/2011 von Groll .............. G06Q 10/02
705/35
9,830,315 B1 * 11/2017 Xiao .................... G06F 17/2785
(Continued)

OTHER PUBLICATIONS

Tai, Kai Sheng, Richard Socher, and Christopher D. Manning. "Improved semantic representations from tree-structured long short-term memory networks." arXiv preprint arXiv:1503.00075 (2015). (Year: 2015).*

(Continued)

*Primary Examiner* — Shaun Roberts

(57) ABSTRACT

A constituent-centric neural architecture for reading comprehension is disclosed. One embodiment provides a method that performs reading comprehension comprising encoding individual constituents from a text passage using a chain of trees long short-term encoding, encodes question related to the text passage using a tree long short-term memory encoding, generates a question-aware representation for each constituent in the passage using a tree-guided attention mechanism, generates a plurality of candidate answers from the question-aware representation using hierarchical relations among constituents, and predicts an answer to the question in relation to the text passage using a feed-forward network. Other embodiments are disclosed herein.

16 Claims, 5 Drawing Sheets

(56) References Cited

U.S. PATENT DOCUMENTS

| | | | |
|---|---|---|---|
| 10,229,111 B1* | 3/2019 | Filippova | G06F 17/277 |
| 10,255,269 B2* | 4/2019 | Quirk | G06F 17/2775 |
| 2014/0236578 A1* | 8/2014 | Malon | G06F 17/28 |
| | | | 704/9 |
| 2016/0180215 A1* | 6/2016 | Vinyals | G06F 17/2705 |
| | | | 706/20 |
| 2017/0132528 A1* | 5/2017 | Aslan | G06N 20/00 |
| 2017/0293725 A1* | 10/2017 | Liu | G06F 19/321 |
| 2018/0150743 A1* | 5/2018 | Ma | G06N 3/084 |

OTHER PUBLICATIONS

Zhang, Xingxing, Liang Lu, and Mirella Lapata. "Top-down tree long short-term memory networks." arXiv preprint arXiv:1511. 00060 (2015). (Year: 2015).*

* cited by examiner

Passage:
The most authoritative account at the time came from the medical faculty in Paris in a report to the king of France that blamed the heavens. This report became the first and most widely circulated of a series of plague tracts that sought to give advice to sufferers. That the plague was caused by bad air became the most widely accepted theory. Today, this is known as the Miasma theory.

Question 1: Who was the medical report written for?
Answer: the King of France

Question 2: What is the newer, more widely accepted theory behind the spread of the plague?
Answer: bad air Question 3: What is the bad air theory officially known as?
Answer: Miasma theory

CONSTITUENT CENTRIC ARCHITECTURE FOR READING COMPREHENSION

PRIOR RELATED APPLICATIONS

This patent application claims priority to prior filed U.S. Provisional Patent Application Ser. No. 62/484,833, entitled "Constituent Centric Architecture for Reading Comprehension" and filed on Apr. 12, 2017, and U.S. Provisional Patent Application Ser. No. 62/654,671, entitled "A Constituent-Centric Neural Architecture for Reading Comprehension" and filed on Apr. 9, 2018, the contents of which are included herein by reference in their entireties.

FIELD OF INVENTION

The invention relates generally to neural networks for natural language processing, and more specifically, is directed to constituent-centric neural architectures for reading comprehension.

BACKGROUND

Reading comprehension is a challenging area for machine learning. Reading comprehension involves answering questions based on a text passage that may be multiple sentences or paragraphs. In multiple choice answer formats, there are candidate answers to compare against a text passage. However, when there are no candidate answers, correct answers may depend upon any section of the text passage and therefore may have considerable syntactic divergence with the text passage.

SUMMARY

Accordingly, a constituent-centric neural architecture for reading comprehension is disclosed. For example, one embodiment provides a method for performing reading comprehension comprising encoding individual constituents from a text passage using a chain of trees long short-term encoding, encoding a question related to the text passage using a tree long short-term memory encoding, generating a question-aware representation for each constituent in the passage using a tree-guided attention mechanism, generating a plurality of candidate answers from the question-aware representation using hierarchical relations among constituents, and predicting an answer to the question in relation to the text passage using a feed-forward network.

In another example, and embodiment reading comprehension (RC) system includes a parsing module and a Constituent-Centric Neural Network (CCNN) module comprising an encoding sub-module, a tree-guided attention sub-module, a candidate answer generation sub-module and an answer prediction sub-module. In this embodiment, the encoding sub-module is configured for encoding constituents in a text passage and one or more text questions, the tree-guided attention sub-module is configured for learning question-aware representations, the candidate answer generation sub-module is configured for producing candidate answers based on a constituent expansion, and the answer prediction module is configured for selecting the best answer from the candidate answers using a feed-forward network. Other embodiments are disclosed herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 2 illustrates an example passage and questions in a Stanford Question Answering Dataset ("SQuAD").

DETAILED DESCRIPTION

Figure 1:
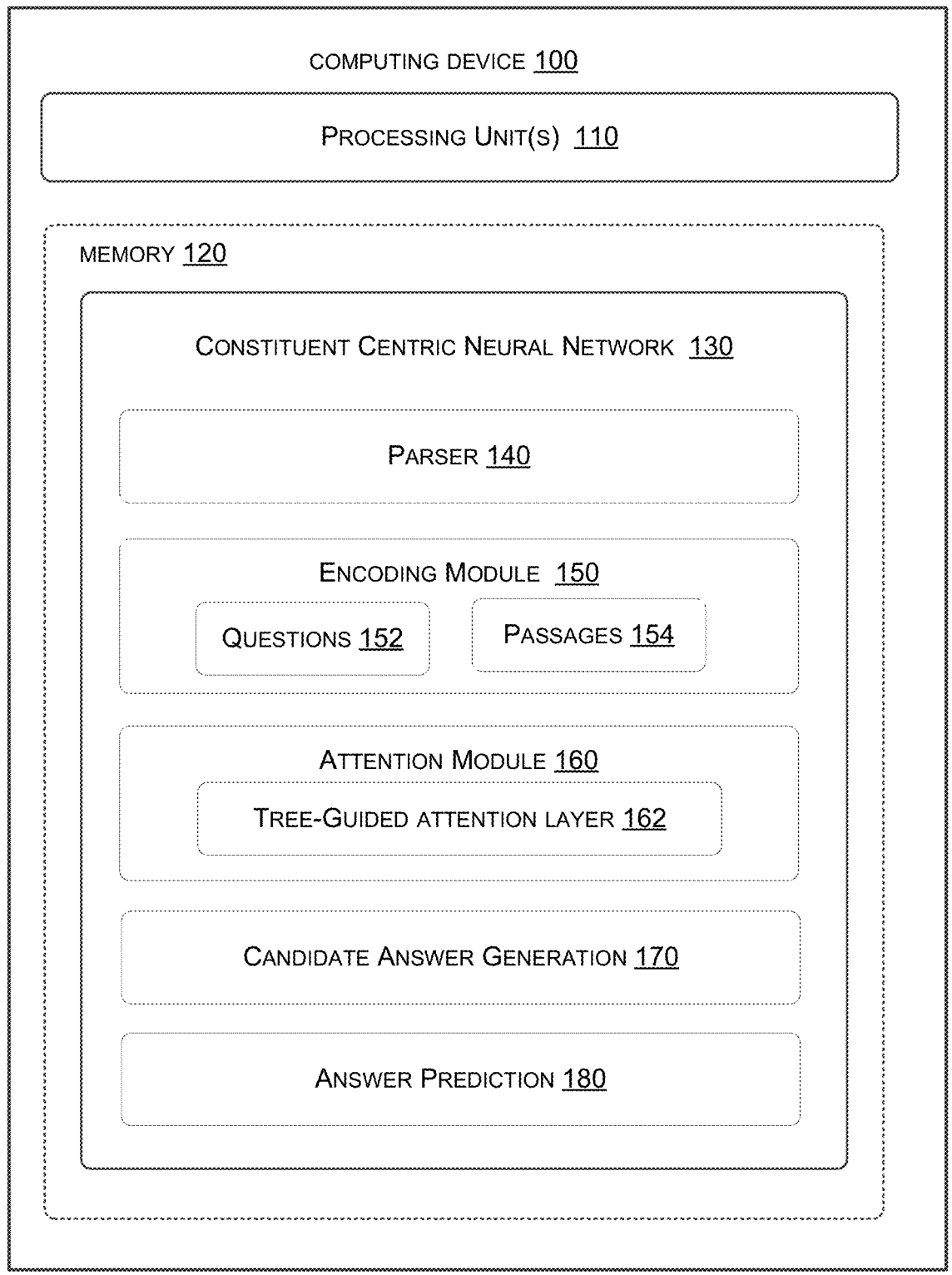
FIG. 1 illustrates an exemplary constituent-centric neural architecture according to one embodiment.

The following description is presented to enable a person of ordinary skill in the art to make and use the invention. Descriptions of specific devices, techniques, and applications are provided only as examples. Various modifications to the examples described herein will be clear to those of ordinary skill in the art, and the general principles defined herein may be applied to other examples and applications without departing from the spirit and scope of the invention. Thus, embodiments of the present invention are not intended to be limited to the examples described herein and shown, but is to be accorded the scope consistent with the claims.

The word "exemplary" is used herein to mean "serving as an example or illustration." Any aspect or design described herein as "exemplary" is not necessarily to be construed as preferred or advantageous over other aspects or designs.

Reference will now be made in detail to aspects of the subject technology, examples of which are illustrated in the accompanying drawings, wherein like reference numerals refer to like elements throughout.

The specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Generally, some disclosed embodiments are constituent-centric neural networks (CCNN) that can perform reading comprehension having as inputs a passage and at least one question, and having as an output a span in the passage that is mostly suitable to answer the question(s). In the embodiment illustrated in FIG. 1 and described below, the CCNN contains four layers; however, other embodiments are not so limited. Generally, in an encoding layer a chain-of-trees LSTM and tree LSTM encode the constituents in the passage and question respectively. The encodings are then fed to a tree-guided attention layer to learn question-aware representations and which are then passed to a candidate-answer generation layer to produce and encode the candidate answers based on constituent expansion. Finally, a prediction layer selects an answer from the candidates using a feed-forward network.

FIG. 1 illustrates an exemplary CCNN 100 enacted as a reading comprehension system on a computing device having memory 120 and one or more processing units 130. A reading comprehension system 100 further includes a parsing module 140 and an encoding module 150 to encode constituents in a text passage and one or more text questions, a tree-guided attention module 160 to learn question-aware representations, a candidate answer generation module 170 to produce candidate answers based on a constituent expansion, and an answer prediction module 180 to select the best answer from the candidate answers using a feed-forward network. In some embodiments, once the passage and questions are presented, the parsing module 140 parses them into constituent parse trees so the encoding module 150 can learn representations for constituents in questions and passages, using tree LSTM, and chain-of-trees LSTM, respectively. These LSTM encoders can capture syntactic properties of constituents and long-range semantics across multiple sentences. Each of the modules of the CCNN shown in FIG. 1 will now be described in more detail.

Figure 3:
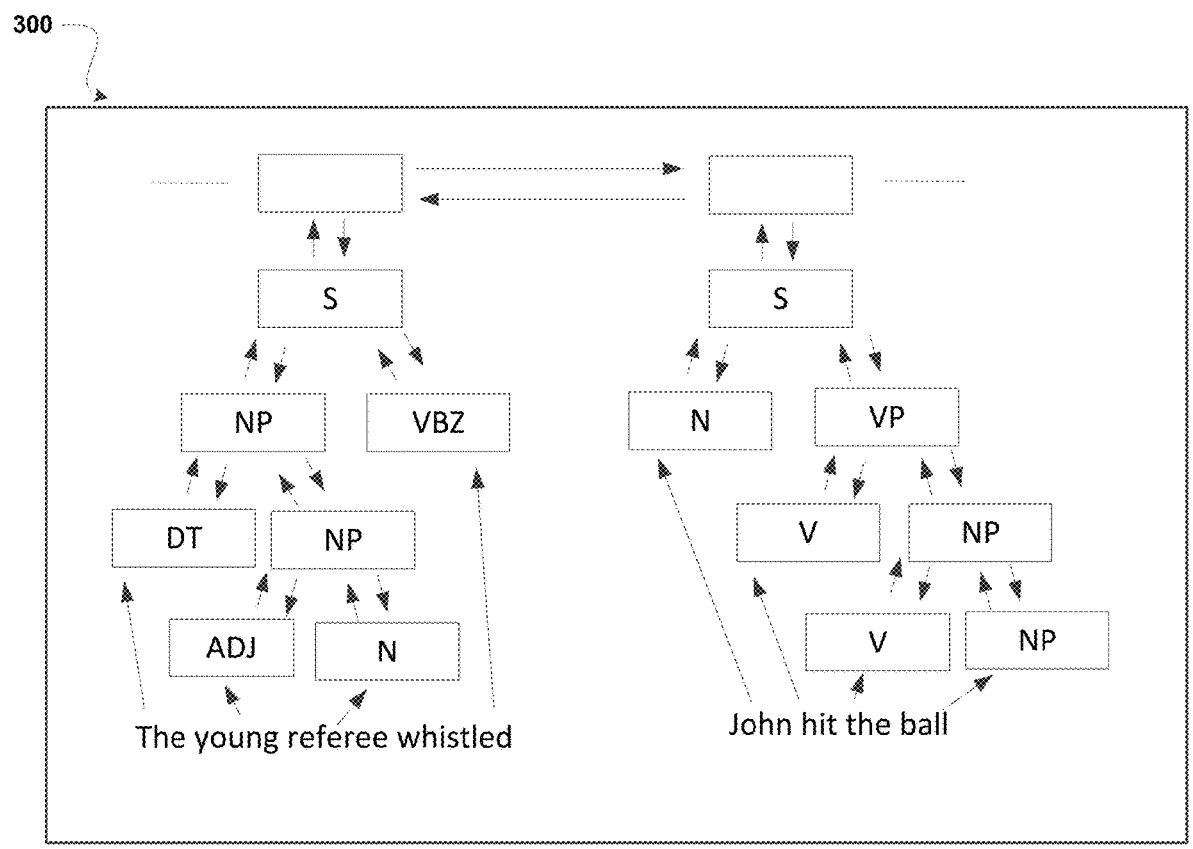
FIG. 3 illustrates an exemplary chain of trees LSTM.

In some embodiments, the encoding module 150 encodes a question related to the text passage using a tree long short-term memory encoding. As each question is typically a single sentence, it will typically have one constituent parse tree. Internal nodes in a parse tree represent constituents having more than one word and leaf nodes represent single-word constituent. The present embodiment includes a bi-directional tree LSTM which consists of a bottom-up LSTM and a top-down LSTM, to encode these constituents, as shown in FIG. 3.

Each node (constituent) has two hidden states: $h_\uparrow$ produced by the LSTM in bottom-up direction, and $h_\downarrow$ produced by the LSTM in top-down direction. Let T denote the maximum number of children an internal node could have. For each particular node, let L ($0 \leq L \leq T$) be the number of children the node has, $h_\uparrow^{(l)}$ and $c_\uparrow^{(l)}$ be the bottom-up hidden state and memory cell of the l-th ($1 \leq l \leq L$) child (if any) respectively and $h_\downarrow^{(p)}$ and $c_\downarrow^{(p)}$ be the top-down hidden state and memory cell of the parent.

In the bottom-up LSTM, each node has an input gate $i_\uparrow$, L forget gates $\{f_\uparrow^{(l)}\}_{l=1}^L$ corresponding to different children, an output gate $o_\uparrow$ and a memory cell $c_\uparrow$. For an internal node, the inputs are the hidden states and memory cells of its children and the transition equations are defined as:

$i_\uparrow = \sigma(\Sigma_{l=1}^L W_\uparrow^{(i,l)} h_\uparrow^{(l)} + b_\uparrow^{(i)});$ $\nabla l, f_\uparrow^{(l)} = \sigma(W_\uparrow^{(f,l)} h_\uparrow^{(l)} + b_\uparrow^{(f,l)});$ $o_\uparrow = \sigma(\Sigma_{l=1}^L W_\uparrow^{(o,l)} h_\uparrow^{(l)} + b_\uparrow^{(o)});$ $u_\uparrow = \tan h(\Sigma_{l=1}^L W_\uparrow^{(u,l)} h_\uparrow^{(l)} + b_\uparrow^{(u)});$ $c_\uparrow = i_\uparrow \odot u_\uparrow + \Sigma_{l=1}^L f_\uparrow^{(l)} + c_\uparrow^{(l)},$ and $h_\uparrow = o_\uparrow \odot \tan h(c_\uparrow).$ (1)

where the weight parameters W and bias parameters b with superscript l such as $W_\uparrow^{(i,l)}$ are specific to the l-th child. For a leaf node which represents a single word, it has no forget gate and the input is the word embedding of this word.

In the present described embodiment, in the top-down direction, the gates, memory cell and hidden state are defined in a similar fashion as the bottom-up direction (Eq.(1)). For an internal node except the root, the inputs are the hidden state $h_\downarrow^{(p)}$ and memory cell $c_\downarrow^{(p)}$ of its parents. For a leaf node, in addition to $h_\downarrow^{(p)}$ and $c_\downarrow^{(p)}$, the inputs also contain the word embedding. For the root node, the top-down hidden state $h_\downarrow^{(r)}$ is set to its bottom-up hidden state $h_\downarrow^{(r)}$. $h_\downarrow^{(r)}$ captures the semantics of all constituents, which is then replicated as $h_\downarrow^{(r)}$ and propagated downwards to each individual constituent.

Concatenating the hidden states of two directions, encoding module 150 obtains the LSTM encoding for each no $h = [h_\uparrow; h_\downarrow]$ which will be the input of the attention layer. The bottom-up hidden state $h_\uparrow$ composes the semantics of sub-constituents contained in this constituent and the top-down hidden state $h_\downarrow$ captures the contextual semantics manifested in the entire sentence.

With reference to the illustrated embodiment, the encoding module 150 encodes individual constituents from the text passage using a chain of trees long short-term encoding by building a bi-directional tree long short-term memory encoding for each sentence and gluing together the bi-directional tree long short-term memory encoding with a bi-directional chain long short-term memory. For example, to encode a passage which contains multiple sentences, encoding module 150 may use a chain-of-trees LSTM as shown in FIG. 3. A bi-directional tree LSTM is built for each sentence to capture the local syntactic structure and these tree LSTMs are glued together via a bi-directional chain LSTM to capture long-range semantics spanning multiple sentences. The hidden states generated by the bottom-up tree LSTM serve as the input of the chain LSTM. Likewise, the chain LSTM states are fed to the top-down tree LSTM. This enables the encoding module 150 to encode every constituent to be propagated to most or all other constituents in the passage.

In the illustrated embodiment using a chain LSTM, each sentence t is treated as a unit. The input of this unit is generated by the tree LSTM of sentence t, which is the bottom-up hidden state $h_{\uparrow t}$ at the root. Sentence t is associated with a forward hidden state $\vec{h}_t$ and a backward state $\overleftarrow{h}_t$. In the forward direction, the transition equations among the input gate $\vec{i}_t$, forget gate $\vec{f}_t$, output gate $\vec{o}_t$, and memory cell $\vec{c}_t$ are:

$\vec{i}_t = \sigma(\vec{W}^{(i)} h_{\uparrow t} + \vec{U}^{(i)} \vec{h}_{t-1} + \vec{b}^{(i)})$ $\vec{f}_t = \sigma(\vec{W}^{(f)} h_{\uparrow t} + \vec{U}^{(f)} \vec{h}_{t-1} + \vec{b}^{(f)})$ $\vec{o}_t = \sigma(\vec{W}^{(o)} h_{\uparrow t} + \vec{U}^{(o)} \vec{h}_{t-1} + \vec{b}^{(o)})$ $\vec{u}_t = \tan h(\vec{W}^{(u)} h_{\uparrow t} + \vec{U}^{(u)} \vec{h}_{t-1} + \vec{b}^{(u)})$ $\vec{c}_t = \vec{i}_t \odot \vec{u}_t + \vec{f}_t \odot \vec{c}_{t-1}$ $\vec{h}_t = \vec{o}_t \tan h(\vec{c}_t)$ (2)

The backward LSTM is defined in a similar way. Subsequently, $\vec{h}_t$ and $\overleftarrow{h}_t$, which encapsulate the semantics of all sentences, are input to the root of the top-down tree LSTM and propagated to all the constituents in sentence i.

In this way, encoding module 150 uses a CT-LSTM to encode a passage in the following way: (1) the bottom-up tree LSTMs compute hidden states $h_\uparrow$ for each sentence and feed $h_\uparrow$ of the root node into the chain LSTM; (2) the chain LSTM computes forward and backward states and feed them into the root of the top-down tree LSTMs; (3) the top-down tree LSTMs compute hidden states $h_↓$. At each constituent C, the bottom-up state $h_↑$ may capture the semantics of subconstituents in C and the top-down state $h_↓$ may capture the semantics of the entire passage.

With reference to the embodiment in FIG. 1, a tree-guided attention module 160 may be a chain of trees long short-term memory configured to compute hidden states for each sentence in the passage using bottom-up tree long short-term memory encodings and feed the hidden states for each sentence into a root node of the chain of trees long short-term memory. Further, attention module 160 may then compute forward and backward states in the chain of trees long short-term memory and feeding the forward and backward states into a root of the top-down tree long short-term memory and compute top down hidden states capturing semantics of the passage. The attention module 160 will now be described in more detail.

A tree-guided attention (TGA) mechanism may be used as attention module 160 to learn a question-aware representation for each constituent in the passage, which consists of three elements: (1) a constituent-level attention score computation; (2) a tree-guided local normalization; and (3) a tree-guided attentional summarization. Given a constituent $h^{(p)}$ in the passage, for each constituent $h^{(q)}$ in the question, an unnormalized attention weight score a is computed as $a=h^{(p)} h^{(q)}$ which measures a similarity between the two constituents. Then a tree-guided local normalization is performed of these scores. At each internal node in the parse tree, where the unnormalized attention scores of its L children are $\{a_l\}_{l=1}^{L}$, a local normalization is performed using a softmax operation $ã_l=\exp(a_l)/\Sigma_{m=1}^{L}\exp(a_m)$ which maps these scores into a probabilistic simplex. This normalization scheme stands in contrast with the global normalization adopted in word-based attention, where a single softmax is globally applied to the attention scores of all the words in the question.

Given these locally normalized attention scores, the LSTM encodings of constituents in the question may be merged into an attentional representation in a recursive and bottom-up way. For example, at each internal node, let h be its LSTM encoding, a and $\{a_l\}_{l=1}^{L}$ be the normalized attention scores of this node and its L children, and $\{b_l\}_{l=1}^{L}$ be the attentional representations generated at the children, then the attentional representation b of this node is defined as:

$$b=a(h+\Sigma_{l=1}^{L}a_l b_l) \quad (3)$$

which takes the weighted representation $\Sigma_{l=1}^{L}a_l b_l$ contributed from its children, adds in its own encoding h, then performs a re-weighting using the attention score a. The attentional representation $b^{(r)}$ at the root node acts as the final summarization of constituents in the question. Then, attention module 160 may concatenate it to the LSTM encoding $h^{(p)}$ of the passage constituent and obtain a concatenated representation $z=[h^{(p)}; b^{(r)}]$ which will be the input of the candidate answer generation layer.

Unlike a word-based flat-structure attention mechanism where the attention scores are computed between words and normalized using a single global softmax, and the attentional summary is computed in a flat manner, the tree-guided attention calculates attention scores between constituents, normalizes them locally at each node in the parse tree and computes the attentional summary in a hierarchical way.

With reference to the embodiment illustrated in FIG. 1, the candidate answer module 170 may be configured to expand each constituent by appending adjacent words, to perform reduction on the expanded constituents by removing overlap from duplicated expansions, and encode candidate answers using a bi-directional chain long short-term memory mechanism. We now turn to the candidate answer module 170 in detail.

While most correct answers in a training set are exactly constituents, some of them are not the case. To cover the non-constituent answers, candidate answer module 170 may expand each constituent by appending words adjacent to it. Let C denote a constituent and S="... $w_{i-1}w_i C w_j w_{j+1}$ ..." be the sentence containing C. C may be expanded by appending words preceding C (such as $w_{i-1}$ and $w_i$) and words succeeding C (such as $w_j$ and $w_{j-1}$) to C. Next, an (l, r)-expansion of a constituent C may be defined as follows: append l words preceding C in the sentence to C; append r words succeeding C to C. Let M be the maximum expansion number that l≤M and r≤M, as shown in the example in FIG. 4.

Figure 4:
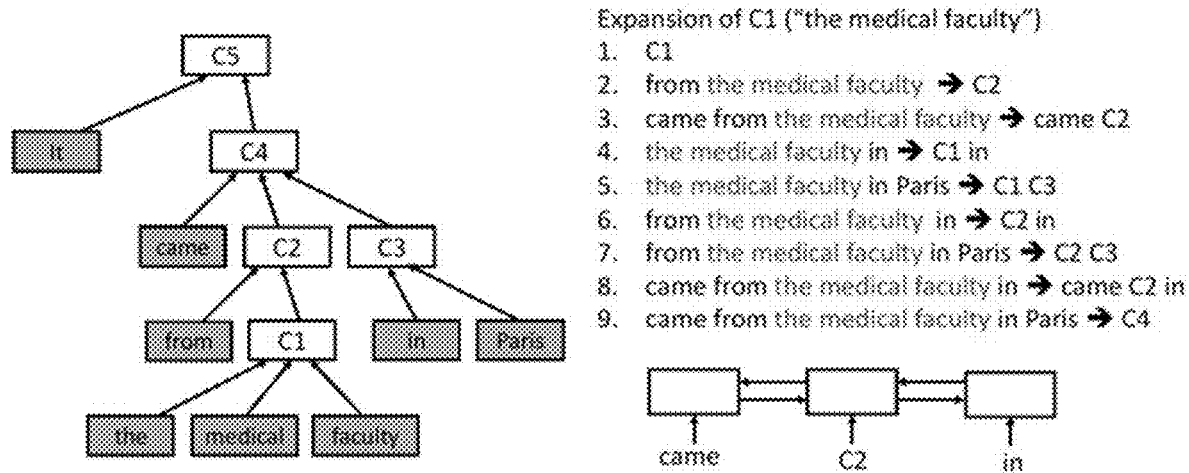
FIG. 4 illustrates an exemplary constituent expansion.

On the left side of FIG. 4 is the constituent parse tree of the sentence "it came from the medical faculty in Paris". On the upper right are the expansions of the constituent C1—"the medical faculty". To expand this constituent, it can be traced back to the sentence and then look up the M (M=2 in this case) words preceding C1 (which are "came" and "from") and succeeding C1 (which are "in" and "Paris"). Then, combinations of C1 and the preceding/succeeding words are taken to generate constituent expansions. In this embodiment, there are three choices of expansion on both the left and right side of C1: expanding 0, 1, 2 words. Taking combination of these cases, 9 expansions may be obtained, including C1 itself as the ((0, 0)-expansion).

The next step is to perform reduction of constituent expansions. Two things need to be reduced. First, while expanding the current constituent, new constituents may come into being. For instance, in the expansion "came from C1 in Paris", "in" and "Paris" form a constituent C3; "from" and C1 form a constituent C2; "came", C2 and C3 form a constituent C4. Eventually, this expansion is reduced to C4. Second, the expansions generated from different constituents may have overlap and the duplicated expansions need to be removed. For example, the (2, 1)-expansion of C1—"came from the medical faculty in"—can be reduced to "came C2 in", which is the (1, 1)-expansion of C2. After reduction, each expansion is a sequence of constituents.

Next, candidate answer module 170 may encode these candidate answers and the encodings will be utilized in the prediction layer. As shown in FIG. 4 in the bottom right, since each expansion is a constituent sequence, a bi-directional chain LSTM may be used to synthesize the representations of individual constituents therein. For example, let E=C1 ... Cn be an expansion consisting of n constituents. In the chain LSTM, the input of unit i is the combined representation of $C_i$. Next, candidate answer module 170 concatenates the forward hidden state at $C_n$ and backward state at $C_1$ as a final representation of E.

With reference back to the embodiment illustrated in FIG. 1, in general, answer prediction module 180 selects an answer from the candidates using a feed-forward network. However, other embodiments are not limited to a feed-forward network. In one example, answer prediction module 180 may predict an answer to the question in relation to the text passage using a feed-forward network further configured to receive a feature vector and generate a confidence score for each candidate answer. In another embodiment, the answer prediction module may be configured to normalize confidence scores for the candidate answers into a probabilistic simplex using softmax, and define a cross entropy loss of the normalized confidence scores.

In this example, given the representation of candidate answers, a feed-forward network $f: \mathbb{R}^d \to \mathbb{R}$ may be used to predict the correct answer. The input of the network is the feature vector of a candidate answer and the output is a confidence score. The one with the largest score is chosen as the correct answer. For parameter learning, answer prediction module 180 normalizes confidence scores into a probabilistic simplex using softmax and define a cross entropy loss thereupon. Let $J_k$ be the number of candidate answers produced from the k-th passage-question pair and $\{z_j^{(k)}\}_{j=1}^{J_k}$ be their representations. Let $t_k$ be the index of the correct answer. Then the cross-entropy loss of K pairs is defined as:

$$\Sigma_{k=1}^{K}(-f(z_{t_k}) + \log \Sigma_{j=1}^{J_k} \exp(f(z_j^{(k)}))) \quad (4)$$

In this example, model parameters are learned by minimizing this loss using stochastic gradient descent, however other embodiments are not limited to this feature.

Figure 5:
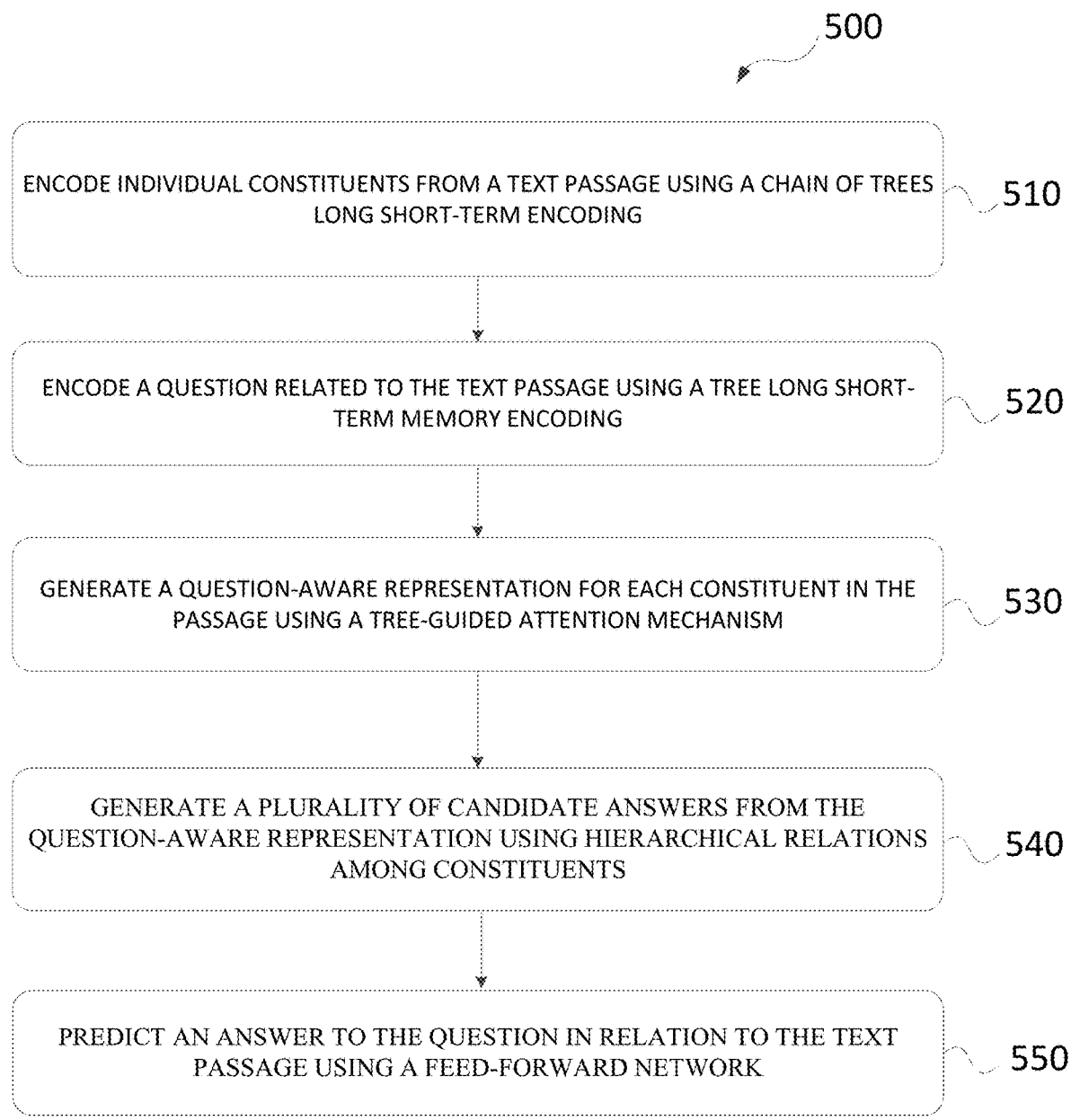
FIG. 5 shows a method for constituent-centric neural architecture according to one embodiment.

FIG. 5 shows an embodiment method 500 for constituent-centric neural architecture according to one embodiment. Method 500 is an exemplary method, but other methods may be practices within the teachings of this disclosure. For example, the procedures described above in detail with reference to system 100 may also be embodied as a method. In block 510, method 500 encodes individual constituents from a text passage using a chain of trees long short-term encoding. Next, a question is encoded related to the text passage using a tree long short-term memory encoding in block 520. Block 530 generates a question-aware representation for each constituent in the passage using a tree-guided attention mechanism. Next, in block 540, method 500 generates a plurality of candidate answers from the question-aware representation using hierarchical relations among constituents. Then in block 550, it predicts an answer to the question in relation to the text passage using a feed-forward network.

While various embodiments of the invention have been described above, they have been presented by way of example only, and not by way of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations.

Additionally, although the disclosure is described above in terms of various exemplary embodiments and implementations, the various features and functionality described in one or more of the individual embodiments are not limited in their applicability to the particular embodiment with which they are described. They instead can be applied alone or in some combination, to one or more of the other embodiments of the disclosure, whether or not such embodiments are described, and if such features are presented as being a part of a described embodiment. Thus, the breadth and scope of the present disclosure should not be limited by any of the above-described exemplary embodiments.

In this document, the terms "module" and "engine" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

In this document, the terms "computer program product", "computer-readable medium", and the like, may be used generally to refer to media such as, memory storage devices, or storage unit. These, and other forms of computer-readable media, may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to", or other like phrases in some instances shall not be read to mean that the narrower case is intended or required in instances where such broadening phrases may be absent.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined. The inclusion in different claims does not imply that a combination of features is not feasible and/or advantageous. Also, the inclusion of a feature in one category of claims does not imply a limitation to this category, but rather the feature may be equally applicable to other claim categories, as appropriate.

The invention claimed is:

1. A method for performing reading comprehension (RC), comprising:
    encoding individual constituents from a text passage using a chain of trees long short-term encoding, wherein encoding individual constituents from the text passage using a chain of trees long short-term encoding further comprises:
        building a bi-directional tree long short-term memory encoding for each sentence; and
        gluing together the bi-directional tree long short-term memory encoding with a bi-directional chain long short-term memory;
    encoding a question related to the text passage using a tree long short-term memory encoding;
    generating a question-aware representation for each constituent in the passage using a tree-guided attention mechanism;
    generating a plurality of candidate answers from the question-aware representation using hierarchical relations among constituents; and
    predicting an answer to the question in relation to the text passage using a feed-forward network.

2. The method of claim 1, wherein the chain of trees long short-term memory encoding further comprises:
    computing hidden states for each sentence in the passage using bottom-up tree long short-term memory encodings and feeding the hidden states for each sentence into a root node of the chain of trees long short-term memory;
    computing forward and backward states in the chain of trees long short-term memory and feeding the forward and backward states into a root of the top-down tree long short-term memory; and
    computing top down hidden states capturing semantics of the passage.

3. The method of claim 1, wherein encoding a question related to the text passage using a tree long short-term memory encoding further comprises encoding constituents using a bi-directional long short-term memory and a top-down long short-term memory.

4. The method of claim 1, wherein the tree-guided attention mechanism further comprises:
    measuring similarity between a constituent in the text passage and a constituent in the question using a constituent-level attention score computation;
    generating locally normalized attention scores using a tree-guided local normalization; and
    generating a tree-guided attentional summarization.

5. The method of claim 1, wherein generating a plurality of candidate answers from the question-aware representation using hierarchical relations among constituents further comprises:
    expanding each constituent by appending adjacent words;
    performing reduction on the expanded constituents by removing overlap from duplicated expansions; and
    encoding candidate answers using a bi-directional chain long short-term memory mechanism.

6. The method of claim 1, wherein predicting an answer to the question in relation to the text passage using a feed-forward network further comprises receiving a feature vector and generating a confidence score for each candidate answer.

7. The method of claim 6, further comprising:
    normalizing confidence scores for the candidate answers into a probabilistic simplex using softmax; and
    defining a cross entropy loss of the normalized confidence scores.

8. A reading comprehension (RC) system with memory and a processor, the reading comprehension system comprising:
    a parsing module; and
    a Constituent-Centric Neural Network (CCNN) module stored in memory and comprising an encoding module to encode constituents in a text passage and one or more text questions, a tree-guided attention module to learn question-aware representations, a candidate answer generation module, the candidate answer generation module to produce candidate answers based on a constituent expansion, and an answer prediction module to select the best answer from the candidate answers using a feed-forward network, wherein the encoding module encodes individual constituents from the text passage using a chain of trees long short-term encoding by building a bi-directional tree long short-term memory encoding for each sentence and gluing together the bi-directional tree long short-term memory encoding with a bi-directional chain long short-term memory.

9. The system of claim 8, wherein the tree-guided attention module is a chain of trees long short-term memory configured to compute hidden states for each sentence in the passage using bottom-up tree long short-term memory encodings and feed the hidden states for each sentence into a root node of the chain of trees long short-term memory;
    compute forward and backward states in the chain of trees long short-term memory and feeding the forward and backward states into a root of the top-down tree long short-term memory; and
    compute top down hidden states capturing semantics of the passage.

10. The system of claim 8, wherein the encoding module encodes a question related to the text passage using a tree long short-term memory encoding.

11. The system of claim 10, the encoding module to encode constituents using a bi-directional long short-term memory and a top-down long short-term memory.

12. The system of claim 8, wherein the tree-guided attention module is to measure similarity between a constituent in the text passage and a constituent in the question using a constituent-level attention score computation;
    generate locally normalized attention scores using a tree-guided local normalization; and
    generate a tree-guided attentional summarization.

13. The system of claim 8, wherein the candidate answer module is configured to expand each constituent by appending adjacent words;
    perform reduction on the expanded constituents by removing overlap from duplicated expansions; and
    encode candidate answers using a bi-directional chain long short-term memory mechanism.

14. The system of claim 8, wherein to predict an answer to the question in relation to the text passage uses a feed-forward network further configured to receive a feature vector and generate a confidence score for each candidate answer.

15. The system of claim 14, wherein the answer prediction module is configured to normalize confidence scores for the candidate answers into a probabilistic simplex using softmax; and
- define a cross entropy loss of the normalized confidence scores.

16. A method for performing reading comprehension (RC), comprising:
- parsing a text passage and one or more text questions into constituents;
- encoding said constituents in an encoding sub-module and sending encoded constituents to a tree guided attention sub-module to learn question-aware representations;
- receiving said question-aware representations in a candidate answer generation sub-module to generate candidate answers; and
- selecting the best answer from said candidate answers in an answer prediction sub-module, wherein the encoding sub-module encodes the constituents from the text passage using a chain of trees long short-term encoding by building a bi-directional tree long short-term memory encoding for each sentence and gluing together the bi-directional tree long short-term memory encoding with a bi-directional chain long short-term memory.

\* \* \* \* \*